(12) United States Patent
Yildirim

(10) Patent No.: US 12,269,981 B2
(45) Date of Patent: Apr. 8, 2025

(54) USING A SOIL TREATMENT TO ENHANCE THE REFLECTIVITY OF SURFACES SURROUNDING BIFACIAL SOLAR PANELS IN ORDER TO INCREASE THEIR EFFICIENCY

(71) Applicant: Yetkin Yildirim, Austin, TX (US)

(72) Inventor: Yetkin Yildirim, Austin, TX (US)

( * ) Notice: Subject to any disclaimer, the term of this patent is extended or adjusted under 35 U.S.C. 154(b) by 73 days.

(21) Appl. No.: 17/750,046

(22) Filed: May 20, 2022

(65) Prior Publication Data

US 2022/0372370 A1 Nov. 24, 2022

Related U.S. Application Data

(60) Provisional application No. 63/191,232, filed on May 20, 2021.

(51) Int. Cl.
| | |
|---|---|
| *C09K 17/44* | (2006.01) |
| *B05D 1/00* | (2006.01) |
| *E02D 19/16* | (2006.01) |
| *H02S 20/10* | (2014.01) |
| *H02S 40/22* | (2014.01) |

(52) U.S. Cl.
CPC ............... *C09K 17/44* (2013.01); *B05D 1/00* (2013.01); *E02D 19/16* (2013.01); *H02S 20/10* (2014.12); *H02S 40/22* (2014.12)

(58) Field of Classification Search
CPC .................................. B05D 1/00; C09K 17/44
See application file for complete search history.

(56) References Cited

U.S. PATENT DOCUMENTS

| | | | | |
|---|---|---|---|---|
| 5,223,781 | A | * | 6/1993 | Criswell ................ B64G 1/428 290/1 R |
| 2011/0290375 | A1 | | 12/2011 | Hertz et al. |
| 2012/0260819 | A1 | * | 10/2012 | Ganpule .................. C09D 7/48 106/286.2 |
| 2013/0195553 | A1 | | 8/2013 | Yildirim |
| 2015/0326176 | A1 | | 11/2015 | Austin |
| 2015/0329737 | A1 | | 11/2015 | Robb et al. |
| 2015/0331972 | A1 | * | 11/2015 | McClure ................ G06F 17/11 703/2 |
| 2016/0002473 | A1 | | 1/2016 | Yildirim |
| 2018/0022924 | A1 | | 1/2018 | Temperley et al. |
| 2020/0343852 | A1 | * | 10/2020 | Chentnik ................ F21S 8/085 |

FOREIGN PATENT DOCUMENTS

| | | | |
|---|---|---|---|
| AU | 2018264090 B2 | | 5/2019 |
| WO | 2020183213 A1 | | 9/2020 |
| WO | WO2020183213 | * | 9/2020 |

OTHER PUBLICATIONS

"Roads and Infrastructure for Sustainable Energy," Natural Paving, Inc. Mar. 31, 2022. [Retrieved Apr. 25, 2022] Retrieved from the Internet: <https://www.landlocknaturalpaving.com/sustainable-energy>.

(Continued)

*Primary Examiner* — Nathan T Leong
(74) *Attorney, Agent, or Firm* — J. Roger Williams, Jr.

(57) ABSTRACT

A method of soil treatment that allows for the creation of or installation of a highly reflective surface for use in conjunction with bifacial solar panels to more efficiently generate clean energy.

14 Claims, 1 Drawing Sheet

(56) References Cited

OTHER PUBLICATIONS

"Top-Seal Albedo—Liquid Base Albedo, Stabilizer & Sealant," Terra Pave International, Inc. publication date on or before May 19, 2021. [Retrieved Aug. 8, 2022] Retrieved from the Internet. <https://www.ecoestates.us/terrapave/tsalbedo.pptx>.

"Terra Pave Products for Solar & Pavement Industries," PowerPoint presentation. Terra Pave International, Inc. Publication date on or before May 19, 2021. [Retrieved on May 19, 2022] Retrieved from the Internet. <https://www.ecoestates.us/terrapave/tpalbedo.pdf>.

International Search Report (PCT/ISA/210), issued Aug. 19, 2022.

* cited by examiner

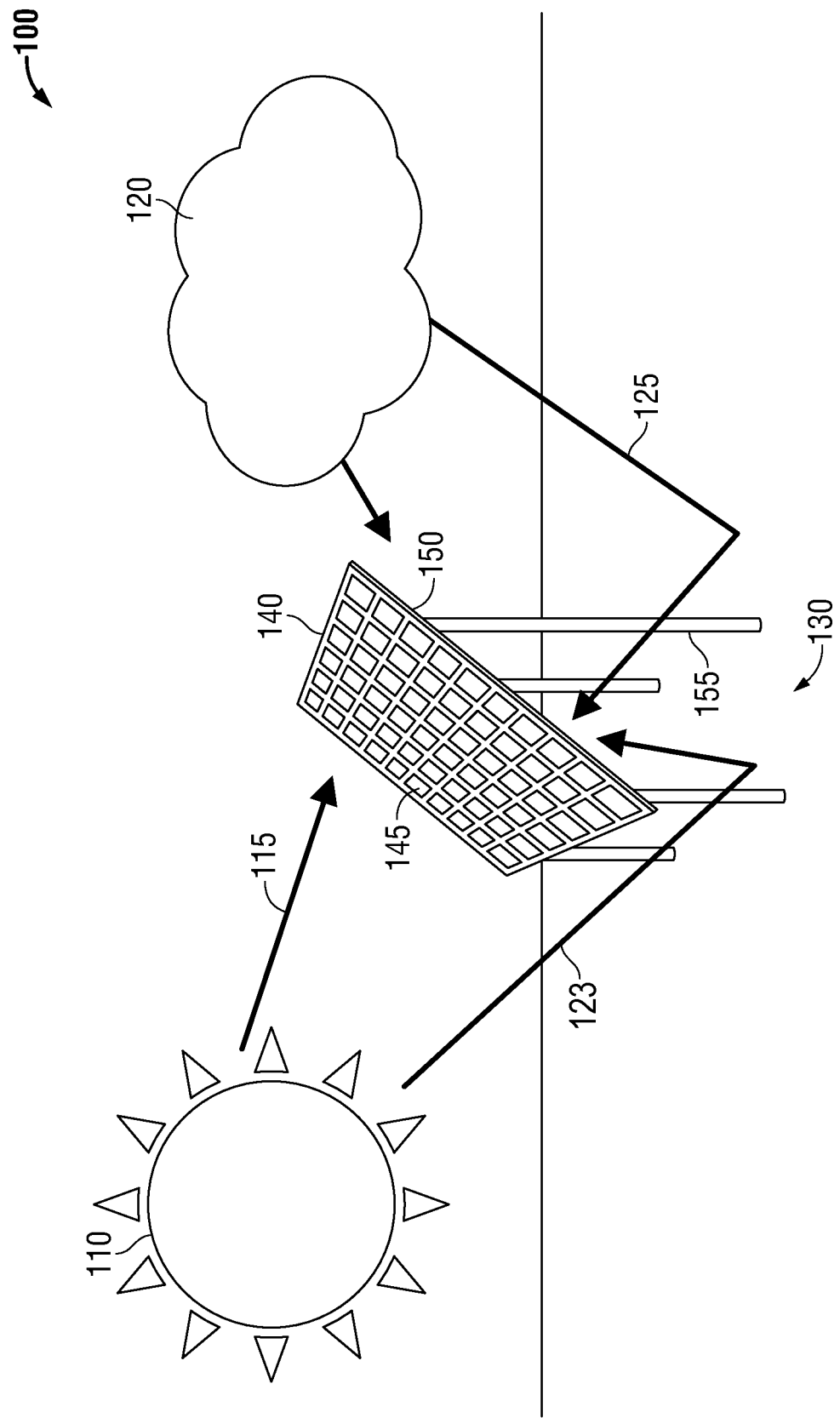

USING A SOIL TREATMENT TO ENHANCE THE REFLECTIVITY OF SURFACES SURROUNDING BIFACIAL SOLAR PANELS IN ORDER TO INCREASE THEIR EFFICIENCY

CROSS-REFERENCE TO RELATED APPLICATIONS

This application claims the benefit of U.S. Provisional Application No. 63/191,232, filed on May 20, 2021, the contents of which are incorporated in their entirety.

FIELD OF THE INVENTION

The present disclosure relates to soil treatment, specifically a method of soil treatment that allows for highly reflective surfaces to be applied over prepared soil for use in conjunction with bifacial solar panels to more efficiently generate clean energy.

BACKGROUND OF THE INVENTION

A bifacial solar panel (also known as a bifacial solar module) is equipped with solar cells on both the top and the rear of the panel. Unlike photovoltaic systems that use traditional monofacial modules, bifacial modules allow light to enter from both the front and back sides of a solar panel. These panels offer greater power output compared to monofacial solar panels, since they produce power from both sides of a silicon solar cell, including light that is reflected onto the rear surface of the panel. The energy output of these panels is proportionately affected by how much reflected light they receive, and ground surfaces that increase reflectivity can thus increase the wattage output of solar panels. By converting both direct and reflected light into electricity, bifacial solar panels can generate as much as 30% more energy than a comparable monofacial system, depending on how and where the system is installed. Thus bifacial solar panel systems are desirable for many commercial and utility-scale uses.

Albedo is a measurement defined by the solar energy community as the fraction of solar radiation that is reflected from the ground, ground cover such as gravel or grass, or bodies of water. Albedo is expressed as a number from 0 to 1, where 1 is total reflection and 0 is total absorption.

The surfaces with albedo close to 1 reflect more sunlight, and when present alongside bifacial solar panels, can improve the efficiency of such panels and thus enable more power generation. The efficiency of bifacial solar cells increases as the spectral albedo or reflectivity of surrounding surfaces increases. This has also been the challenge with bifacial panels. Because they are dependent on the composition of surrounding surfaces, their power output can be unpredictable and difficult to model.

The composition and properties of soil can vary greatly. Such variations and other irregularities can significantly affect the reflective characteristics of surfaces constructed thereon.

Conventional stabilization aids that can be mixed with soils include cements, for example Portland cement, lime, gypsum, fly ash, and polymers. But these conventional stabilization products rarely improve the reflectivity or albedo numbers of the resulting surface to a significant degree.

Thus, there is a need for a high albedo or high reflective soil treatment product that will increase the reflectivity (or albedo numbers) and regularity of the resulting surface, especially where this can improve the efficiency of bifacial solar panels.

BRIEF SUMMARY

Disclosed herein is a method of treating soil to increase efficiency of bifacial solar panels, including stabilizing the soil under an installation of one or more bifacial solar panels and applying a soil treatment to the stabilized soil, thereby increasing the reflectivity of the soil relative to untreated soil. The soil treatment may include a high albedo coloring pigment material, for example, titanium dioxide, and/or a soil sealant. The method may include adding a reflective covering to the soil, which may include a reflective metal or a mirrored surface. Also disclosed herein is a method of treating a soil surface to increase efficiency of bifacial solar panels, including applying a fog coat to a soil surface under an installation of one or more bifacial solar panels.

Also disclosed is a soil treatment composition comprising a reflective material and at least one soil sealant for use in an installation of one or more bifacial solar panels. The reflective material may include a titanium oxide or titanium dioxide.

FIGURES

The description below may refer to the following drawings, wherein like numerals refer to like elements, and wherein:

FIG. 1 illustrates an exemplary installation of bifacial solar panels.

DETAILED DESCRIPTION

Disclosed herein is a high albedo or highly reflective soil treatment method and composition that will increase the reflectivity (or albedo numbers) and regularity of the resulting surface, especially where this can improve the efficiency of bifacial solar panels.

This soil treatment, in embodiments, results in a smooth surface, which by itself will help raise the reflectivity or albedo number of the surface. It is important to note that bifacial panels work best on a larger industrial scale like a solar power plant. This makes soil treatment especially important, as a large number of solar panels could be made substantially more effective by the relatively small improvement of stabilizing and treating nearby soil surfaces. This need and other needs are satisfied by the compositions and methods of the present disclosure.

In some embodiments, soil must be stabilized prior to the application of a soil treatment with reflective characteristics or other reflective surface material, such as a mirrored surface (e.g., a mirror), reflective metal, or other reflective surface or material. Exemplary stabilization methods can include mechanical methods, such as, for example, compaction and/or mixing fibrous or other reinforcement materials with the soil, and chemical methods, such as, for example, blending binders, water repellants, and/or emulsifiers to the soil to, for example, reduce dusting and modify the behavior of clays within the soil.

In order to offset the increased cost of bifacial panels, it can be beneficial to use a mounting system that maximizes their ability to absorb light from both sides. This involves a mounting system that casts as little shadow as possible, as well as a consideration of the albedo measurement, or reflectivity, of nearby surfaces. Although the mounting height can vary, panels that are around six feet in length are preferably installed at a height of 3.5 feet above a flat surface with a 52 degree tilt. A 13.6 foot long panel is preferably installed at a height between 6.5 and 7 feet with a 52 degree tilt. In either case, the bifacial panel is most efficient when installed over a flat surface treated with high reflective materials. Therefore, soil treatment is an important factor in the optimization of solar panel installation.

FIG. 1 illustrates an exemplary installation 100 of a bifacial solar panel. As shown in FIG. 1, a bifacial solar panel 140 mounted on frame 155 with upper panel aspect 145 and lower panel aspect 150. Upper panel aspect 145 preferably faces the sun 110 at 52 degree angle so as to receive direct sunlight 115. Lower panel aspect 150 faces the ground and receives reflected sunlight, including sunlight 123 reflected off of the soil 130. Lower panel aspect 150 also receives diffuse sunlight, for example sunlight 125 that reflects off of clouds 120 and soil 130 before hitting panel 140.

FIG. 1 illustrates effect of soil treatment containing high reflectivity or high albedo coloring pigment materials on bifacial solar panel efficiency. Since both sides of bifacial panels generate power, power output is proportionately affected by how much light is reflected off ground surfaces and reach the back of the panel. Surfaces with high reflectivity or high albedo reflect more solar radiation, and therefore make bifacial solar panels more efficient. Surfaces with high reflectivity or high albedo also help increase the efficiency of monofacial panels.

The deployment of an innovative, high-albedo or high reflective soil treatment can make a significant economic impact when used as part of an industrial or utility scale solar panel installation. It can offer immense societal benefits by making environmentally sustainable energy more efficient, thereby further reducing greenhouse gas emissions. Incorporating high reflective or high albedo soil treatments into the design and construction of mainstream bifacial solar deployments could also increase the global presence of bifacial PV panels.

In accordance with the purpose(s) of the invention, as embodied and broadly described herein, this disclosure discloses embodiments of a soil treatment with reflective characteristics and a soil stabilizer used in tandem with other reflective surfaces, such as a mirrored surface, reflective metal, or other reflective material, and to the method of installing the same under (including without limitation beneath) and around bifacial solar panels. In an embodiment, the present disclosure provides a soil treatment comprising high reflectivity. In another embodiment, the present disclosure provides a method for stabilizing soil to prepare a smooth surface and ready the soil for the application of other reflective surfaces. In an embodiment, soil stabilization provides a smooth ground surface on which to add (including without limitation attach, apply, install, or place) a reflective metal, a mirrored surface, or other reflective material.

The present invention can be understood more readily by reference to the following detailed description of the invention and the examples included therein. Before the present compounds, compositions, articles, systems, devices, and/or methods are disclosed and described, it is to be understood that they are not limited to specific methods unless otherwise specified, or to particular compositions unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described. All publications mentioned herein are incorporated herein by reference to disclose and describe the methods and/or materials in connection with which the publications are cited.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a polymer" includes mixtures of two or more polymers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further under stood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F B-D, B-E, B-F, C-D, C-E, and C-F are considered dis closed. Likewise, any Subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y. X and Y are present at a weight ratio of 2:5 and are present in such ratio regardless of whether additional components are contained in the compound.

"High albedo coloring pigment" is a pigment that serves as a high reflective color additive such as white color additive.

"High albedo coloring pigment material" refers to a material comprised substantially of white color. "High albedo coloring pigment material" is intended to include, without limitation, i) white coloring compounds having a single definable structure; or ii) aggregates of high albedo coloring pigment particles, wherein the aggregate does not necessarily have a unitary, repeating, and/or definable structure or degree of aggregation.

"Particulate" means a material of separate particles.

"Roadbase" is a blend of gravel and fine materials, which when compacted will form a hard surface with a high level of mechanical strength. TxDOT specification Item 247 (https://ftp.dot.state.tx.us/pub/txdot-info/cmd/cserve/specs/2014/standard/s247.pdf) describes exemplary roadbase material.

The materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure relates to soil treatment, specifically a method of soil treatment that allows for highly reflective surfaces to be applied over the prepared soil for use in conjunction with bifacial solar panels. In one aspect, the soil treatments of the present disclosure can impart increased reflectivity and other desirable characteristics to soils and/or roadbase surfaces.

The soil treatment of the present invention can comprise a high albedo coloring pigment material. In one aspect, the soil treatment comprises water and a high albedo coloring pigment material. In another aspect, the soil treatment comprises an aqueous mixture and/or slurry of a high albedo coloring pigment material. In yet another aspect, the soil treatment comprises a dispersion of a high albedo coloring pigment material in water and/or an aqueous medium. In such an aspect, it is not necessary that the high albedo coloring pigment material have any specific level of dispersion in the water and/or aqueous medium. In one aspect, all or a portion of the high albedo coloring pigment material is at least partially dispersed in the water and/or aqueous medium.

The soil treatment can, in various aspects, also comprise a liquid soil sealant, such as, for example, TOP SEAL WHITE (TSW), available from Terra Pave International, Inc. (Austin, Tex., USA). In other aspects, a liquid soil sealant can comprise a dust control agent, a soil erosion preventative, or a combination thereof. In still other aspects, a liquid soil sealant can comprise one or more polymeric materials. In one aspect, a liquid soil sealant, if present, can comprise an elastomer, such as, for example, a water-soluble elastomer. In another aspect, a soil sealant can comprise one or more polymeric materials, a vinyl acrylic component, a surfactant, water, and optionally one or more components that can provide hardening properties to the composition. In another aspect, a soil sealant can comprise vinyl acrylic polymer. In another aspect, a soil sealant can be a liquid. In yet another aspect, the viscosity of a soil sealant can vary, and the present invention is not intended to be limited to any particular soil sealant. In yet another aspect, a soil sealant can have a pH of from about 3.5 to about 6.5, for example, about 3.5.3.7, 3.9, 4.1, 4.3, 4.5, 4.7, 4.9, 5.1, 5.3, 5.5, 5.7, 5.9, 6.1, 6.3, or 6.5; or from about 4.5 to about 5.5, for example, about 4.5, 4.6, 4.7, 4.8, 4.9, 5.0, 5.1, 5.2, 5.3, 5.4, or 5.5.

In one aspect, the soil stabilizer of the present invention comprises a high albedo coloring pigment material. In another aspect, the high albedo coloring pigment material is a particulate high albedo coloring pigment material. In another aspect, the high albedo coloring pigment material comprises a finely divided particulate white pigment. In yet another aspect, the high albedo coloring pigment material comprises titanium dioxide. In yet another aspect, the high albedo coloring pigment material comprises a titanium oxide. In another aspect, the inventive soil treatment comprises a particulate high albedo coloring pigment material having a tetragonal structure. In yet another aspect, the inventive soil treatment comprises a particulate high albedo coloring pigment material produced from either ilmenite, rutile or titanium slag.

In one aspect, the high albedo coloring pigment material of the present invention comprises particulate titanium dioxide particles formed from either ilmenite, rutile or titanium slag. In another aspect, high albedo coloring pigment material can be produced using either sulfuric acid (sulphate process) or chlorine (chloride route). In other aspects, the high albedo coloring pigment material can comprise a recycled and/or recovered titanium dioxide. It should be understood that the high albedo coloring pigment material can optionally comprise a mixture of varying types of high albedo coloring pigment materials.

In various aspects, the surface of any one or more high albedo coloring pigment material can comprise functional groups that can, for example, be hydrophobic or hydrophilic. In one aspect, a high albedo coloring pigment can be produced and/or modified such that the surface chemistry thereof is suitable for blending with a particular soil and/or other optional soil treatments.

In one aspect, the high albedo coloring pigment material has a large aggregate size and, for example, a high degree of branching. In such an aspect, the high albedo coloring pigment material can provide a reinforcing effect to soil particles and/or roadbase surfaces adjacent thereof and can occlude fluids to increase the viscosity of a mixture of, for example, soil and stabilizing aids.

In another aspect, the morphology (e.g., size and degree of branching) of a high albedo coloring pigment material can be selected so as to impart one or more desired rheological properties to a soil, a roadbase, or a mixture thereof with a stabilizing aid. In another aspect, the high albedo coloring pigment material can comprise a single grade. It should be noted that the properties, such as, for example, particle size, aggregate size, morphology, surface chemistry, and the like, are distributional properties, and that even within a single grade of high albedo coloring pigment variations in properties can occur. In another aspect, the high albedo coloring pigment material can comprise a mixture of two or more grades.

In another aspect, the high albedo coloring pigment material of the present invention can be mixed with one or more other soil modifiers and/or stabilizing aids. In various aspects, a high albedo coloring pigment material can be blended with one or more of lime, cement, gypsum, fly ash, combinations thereof, and/or other soil modifiers and/or stabilizing aids. In another aspect, a high albedo coloring pigment material can be mixed with a polymeric material, an asphalt emulsion, such as, for example, SS-1h, CSS-1 h, an asphalt cutback, such as, for example, MC-30, a non-bituminous product, such as, for example, a non-bituminous prime coat (e.g., EC-30).

In one aspect, the amount of high albedo coloring pigment material contacted with and/or blended with a soil can be any amount suitable for providing a desired change in the resulting soil.

In another aspect, the present invention comprises contacting a treatment, such as, for example, a high albedo coloring pigment containing soil treatment, with a portion of soil, for example in a roadbase. In various aspects, the treatment can be applied to an otherwise unamended soil, a soil or mixture of soil and other materials to be used as a road surface, a roadbase, or a combination thereof. The degree of mixing and/or uniformity of the resulting soil can vary, and no specific amount of mixing or level of homogeneity is required. In one aspect, a portion of a high albedo coloring pigment material or a treatment containing a high albedo coloring pigment material can be contacted with a soil. In another aspect, a treatment can be sprayed onto a soil or roadbase. In another aspect, a portion of a high albedo coloring pigment material or a treatment containing a high albedo coloring pigment material, such as titanium dioxide, can be mixed and/or blended with a soil or mixture of materials that form a roadbase. In yet another aspect, a portion of a high albedo coloring pigment material or a treatment containing a high albedo coloring pigment material can be mixed and/or blended with a soil and/or roadbase such that the high albedo coloring pigment material is uniformly or substantially uniformly distributed throughout the material. In yet another aspect, a portion of a high albedo coloring pigment material or a treatment containing a high albedo coloring pigment material can be mixed and/or blended with a soil or mixture of materials such that the high albedo coloring pigment material is not uniformly or substantially uniformly distributed throughout the same.

Titanium dioxide materials are commercially available (e.g., Bulk Apothecary, Ohio, USA; Cole-Parmer, IL, USA), and one of skill in the art in possession of this disclosure could readily select an appropriate titanium dioxide material.

The high albedo coloring pigment material, water, and optional soil sealant can each be present in any suitable concentration. In various aspects, the treatment can comprise from about 0.5 parts to about 1.5 parts by weight, for example, about 0.5, 0.6, 0.7. 0.8, 0.9, 1, 1.1.1.2, 1.3, 1.4, or 1.5 parts by weight of high albedo coloring pigment material; from about 0.5 parts to about 1.5 parts by weight, for example, about 0.5, 0.6, 0.7, 0.8, 0.9, 1, 1.1, 1.2, 1.3, 1.4, or 1.5 parts by weight of water; and from about 2 parts to about 4 parts by weight, for example, about 2, 2.2, 2.4. 2.6, 2.8, 3, 3.2, 3.5, 3.6, 3.8, or 4 parts by weight of a soil sealant. In one aspect, the treatment comprises about 1 part by weight high albedo coloring pigment material, about 1 part by weight water, and about 3 parts by weight of a soil sealant. In other aspects, the concentrations of any one or more components can vary, and the present invention is not intended to be limited to any particular concentration or range of concentrations. Thus, in another aspect, a treatment can comprise less than about 0.5 parts by weight or greater than about 1.5 parts by weight of high albedo coloring pigment material, less than about 0.5 parts by weight or greater than about 1.5 parts by weight of water, and/or less than about 2 parts by weight or greater than about 4 parts by weight of a soil sealant. In one aspect, the treatment can be prepared, stored, and/or transported in a ready to use concentration. In another aspect, the treatment can be prepared in a concentrated form and can be diluted, for example, with water, prior to use. In another aspect, the concentrations recited above can provide a composition suitable for use as-is. In yet another aspect, a concentrated soil treatment composition having the concentrations of components recited above can be diluted with water in a ratio of from about 1:1 to about 1:10 (parts by weight of concentrate:diluent water), for example, about 1:1, 1:2, 1:3, 1:4, 1:5, 1:6, 1:7, 1:8. 1:9, or 1:10, prior to use. In a specific example, a concentrated soil treatment comprises can be prepared and then diluted about 1:5 with water before use.

In other aspects, one or more conventional stabilization aids, such as, for example, Portland cement, lime, gypsum, fly ash, polymeric materials, asphalt emulsions, asphalt cut backs, and combinations thereof, can be added to a soil stabilizer composition. If added, a conventional stabilization aid can be present in any suitable concentration, such as, for example, from about 0.1 parts by weight to about 10 parts by weight, or more.

The components of a soil treatment, such as, for example, a high albedo coloring pigment material, water, and a soil sealant can be contacted and/or mixed in any manner suitable for an intended application. In one aspect, no specific order of addition and/or degree of mixing is required. In another aspect, the components can be contacted and mixed prior to use such that the treatment composition is homogeneous or substantially homogeneous. In another aspect, at least a portion of the high albedo coloring pigment material and at least a portion of the soil sealant can be contacted prior to the addition of water and/or any other components. In still another aspect, the high albedo coloring pigment material and soil sealant can be contacted prior to the addition of water. Once at least two of the components are contacted, the mixture can optionally be mixed using any conventional means, such as, for example, a slow rotational mixer in a blending tank. In one aspect, a mixer element and/or means for mixing can move through at least a portion of the mixture, for example, in a continuous up and down manner, until the mixture is at least partially blended. It should be appreciated that particular high albedo coloring pigment materials can be difficult to disperse and that the use of such high albedo coloring pigment materials can, in some aspects, require the use of energetic mixing methods, Such as, for example, high shear mixers. In other aspects, no specific degree of mixing and/or dispersion is required. A soil treatment composition can, in one aspect, have a solids content of from about 45% to about 55%, for example, about 45, 46, 47, 48, 49, 50, 51, 52, 53, 54, or 55%. In a specific aspect, a soil stabilizer has a solids content of about 50%. In still other aspects, a soil stabilizer can have a solids content of less than about 45% or greater than about 55%, and the present invention is not intended to be limited to any particular solids content.

A soil stabilizer can also have a viscosity of from about 250 cP to about 350 cP, for example, about 250, 260, 270, 280, 290, 300, 310, 320, 330, 340, or 350 cP. In a specific aspect, a Soil stabilizer has a viscosity of about 300 cP. In still other aspects, a soil stabilizer can have a viscosity of less than about 250 cP or greater than about 350 cP, and the present invention is not intended to be limited to any particular viscosity.

In one aspect, a soil treatment composition, as described herein, can be applied to any soil or roadbase surface. In one aspect, a soil or roadbase surface can be scarified prior to application of a soil treatment. In another aspect, a surface should be at least partially stabilized and compacted prior to application of the soil treatment. In yet another aspect, a surface should be stabilized and well compacted prior to application of the soil treatment. In another aspect, the concentration of a soil treatment can vary depending on, for example, the type of surface and degree of compaction thereof. For example, a soil treatment can be diluted with a greater amount of water when applied to a well compacted soil and/or roadbase surface, so as to facilitate greater penetration of the soil treatment into the soil and/or roadbase. In contrast, a soil treatment can be applied in a more concentrated (or less diluted) form when applied to a less compacted and/or granular soil or roadbase surface. Such a soil or road base surface can, in some aspects, be more difficult to compact, and are thus more suitable for a higher concentration of soil treatment. In yet another aspect, a soil treatment can be applied to an uncompacted or partially compacted soil or roadbase surface, and then the soil or roadbase surface can optionally be compacted after the application. One of skill in the art, in possession of this disclosure, could readily determine an appropriate concentration and/or dilution level for use with a particular soil and/or roadbase surface.

In another aspect, a reflective coating can be utilized as an additive in a surface coating, such as, for example, a chip seal and/or asphalt coating. In such an aspect, the reflective coating can provide extended wear of the surface to which the coating is applied and/or an improved appearance for the coated surface.

A soil treatment can be applied to a soil or roadbase surface in any suitable manner. In one aspect, a soil treatment can be sprayed, for example, from a water truck using a pressurized spray system. In such an aspect, the pressure and application rate should be such that the spray pattern provides an even or substantially even distribution of soil treatment on the soil or roadbase surface. In another aspect, the soil treatment can be applied in a seamless manner, such that only a small overlap, if at all, exists between portions of the treated (e.g., sprayed) soil or roadbase surface. In still other aspects, the soil treatment can be sprayed using other methods, for example, a hose, wand, or non-pressurized system. In still other aspects, a non-spraying method, can be utilized.

The soil treatment can be applied as a single layer application or as multiple layers. In one aspect, a single application of the soil treatment can be made to provide a single layer on the soil and/or roadbase surface. In another aspect, multiple applications of the soil treatment can be made, wherein each layer can be in contact with the previous layer of applied soil treatment or in contact with a different layer. For example, multiple layers of varying composition, one or more of which are the inventive soil treatment, can be applied to a soil or roadbase surface. In such an aspect, it is not necessary that any one or more layers comprise a continuous layer across the soil or roadbase surface. In an exemplary aspect, one or more applications of a soil sealant can be applied to a soil or roadbase as a first layer, followed by one or more applications of the inventive soil treatment, followed by an additional one or more applications of a soil sealant of the same or differing composition. In a specific example, two applications of a soil sealant, such as Top-Seal White, can be applied to a soil or roadbase surface, followed by two applications of the inventive soil treatment, followed by a final application of the Top-Seal White soil sealant.

In other aspects, the treatment can be applied as a fog coat, for example, as a sprayed slurry, onto a road surface or base therefore. In such an aspect, an applied fog coat layer comprising the treatment can reduce permeability of the surface to which the fog coat is applied. In another aspect, such a fog coat can at least partially seal one or more cracks in the Surface to which the fog coat is applied. A fog coat comprising the treatment, if used, can optionally comprise other components as desired for the intended application. In another aspect, the treatment can be used in a tack coat application. In such an aspect, the treatment can provide a traceless tack coat. In another aspect, the treatment can improve adhesion between any two or more layers of pavement or road material. In yet another aspect, the treatment can reduce the permeability between any two or more layers of pavement or road material. In one aspect, if the soil treatment is applied as a fog coat and/or a tack coat application, the soil or roadbase surface to which it is applied should be free or substantially free from dust prior to application. In another aspect, the soil treatment can be applied to a soil or roadbase surface as-is, without further preparation or cleaning of the surface.

In one aspect, contacting and/or mixing a high reflective material or high albedo coloring pigment material and/or a treatment containing a high albedo coloring pigment material can improve one or more properties of a roadbase surface, such as, for example, increasing albedo numbers, reducing energy absorption, reducing the surface temperature, and reducing the permeability of the soil surface.

In one aspect, after application of a soil treatment to a soil or roadbase surface, at least a portion of the treatment can be bound to the soil or roadbase surface. In such an aspect, the soil treatment can help form a hardened wear surface, for example, after drying. In another aspect, the soil treatment can be tightly bound to the soil or roadbase surface after application. In another aspect, the soil treatment can have adhesive properties that can ensure that the soil treatment will remain bound to the soil or roadbase surface and provide an at least partial barrier to moisture penetration.

In an aspect, the present disclosure discloses an all-purpose liquid soil albedo stabilizer and additive that binds and transforms the base into a solid, yet flexible mass that resists fracturing. This solid base is thereby suitable for the addition of a reflective surface material, including for example, reflective metal, one or more mirrored surfaces (e.g., mirrors), mirror or other reflective material in order to further enhance the efficiency of bifacial solar panels. In an embodiment, adding a reflective surface material includes application of the material and may include application of adhesive, glue, or other binding agent. Exemplary reflective metals suitable for use in embodiments include silver, tin, nickel, or chromium, aluminum, and acrylic. Reflective metals can be applied in the form of strips, films, or sheets (e.g., aluminum foil), or may be added or applied to or deposited in or on the soil or other surfaces or substrates (e.g., planks, boards, cardboard, fabrics, sheeting) via processes via a wet process or other processes known to those of skill in the art.

An embodiment of the soil treatment increases solar irradiation reflected from the ground for bi-facial solar panels, prevents ground base failure, vegetation control, dust pollution and soil erosion, increases soil strength and reduces its permeability, and provides resistance to moisture that exceeds Environmental Protection Agency standards.

In an aspect, the soil treatment is a polymer-based emulsion that can be diluted with water. In another aspect the soil treatment is a polymer-based emulsion that requires water dilution. In an aspect it is non-petroleum-based and eco-friendly, evaporating only water during the curing process and emitting no volatile organic compounds (VOCs). In an aspect it does not contain solvents or cause damage to solar farm equipment, roads or vehicles. It is easily applied, requiring no special equipment or handling procedures.

The following additional examples are put forth so as to provide those of ordinary skill in the art with a complete disclosure and description of how the compounds, compositions, articles, devices and/or methods claimed herein are made and evaluated and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in C. or is at ambient temperature, and pressure is at or near atmospheric pressure.

Example 1: High reflective or high albedo soil treatment can be applied to the ground under, beneath, directly beneath, or around a collection of bifacial solar panels.

Example 2: A significant percentage of the ground surrounding the bifacial solar panels receives the highly reflective soil treatment.

Example 3: A significant percentage of the ground under or around, or surrounding, the bifacial solar panels can be stabilized and then covered with a reflective covering (including without limitation a reflective coating) or other reflective surface, such as a mirrored surface or reflective metal.

Example 4: Industrial solar farms can use the high albedo soil treatment between trafficked areas covered in white rock and aggregate.

Example 5: Industrial solar farms can use high reflective rock, aggregate or sand under or around bifacial panels.

Example 6: Industrial solar farms can install high reflective rock, aggregate or sand under or around bifacial panels after the soil has been stabilized.

Example 7: High reflective or high albedo soil treatment can be applied to parking lots composed of concrete or asphalt as a fog coat application, where these parking lots also host bifacial solar panels.

Example 8: High reflective or high albedo soil treatment can be applied to rooftops where bifacial solar panels are or will be mounted.

Example 9: Soil from outside the solar panel installation site can be selected to receive the high reflective or high albedo soil treatment before construction. In this case, it is preferred to select lighter colors of soil and rock to be treated.

An embodiment of an application procedure is as follows: Scarify soil to a required depth or as deep as required in the plans. Use a rotary mixer to completely pulverize soil to the required depth. Using a motor grader, blade all soil material into two windrows, one on either side of the area. Place soil by blading a compactable thin layer across area from one of the windrows. Water can be added to reach Optimum Moisture Content after preferably first determining the moisture content of the soil. Alternate placing lifts across area, watering and compacting until the soil has been brought up to the desired or required depth. Set finish grade stakes by surveying. Hone with a motor grader to finish grade, watering as necessary and compact to final density. In an embodiment, achieve a minimum density. With compaction target to a minimum density as determined by the modified moisture/density relation (ASTM D 1557) at −3 to +3 percent of optimum moisture content. (As an option, compaction to maximum dry density may also be considered.) Complete compaction. Seal the surface with high reflective or high albedo coloring pigment soil treatment. The treatment preferably should be completed in three to five passes and in an embodiment it should be visually uniform throughout the road surface without any runoffs.

Although embodiments of the present invention have been described in detail, it will be apparent to those skilled in the art that many embodiments taking a variety of specific forms and reflecting changes, substitutions and alterations can be made without departing from the spirit and scope of the inventions disclosed herein. The described embodiments illustrate the scope of the claims but do not restrict the scope of the claims.

What is claimed is:

1. A method of treating soil to increase efficiency of bifacial solar panels, comprising: stabilizing the soil under an installation of one or more bifacial solar panels wherein stabilizing the soil comprises smoothing the ground surface of the soil; and applying a soil treatment to the stabilized soil, thereby increasing the reflectivity of the soil relative to untreated soil; wherein the soil treatment comprises one or more soil sealants to reduce soil permeability and moisture penetration in soil.

2. The method of claim 1, wherein applying a soil treatment comprises adding a reflective covering.

3. The method of claim 2, wherein the reflective covering comprises a reflective metal.

4. The method of claim 2, wherein the reflective covering comprises a mirrored surface.

5. The method of claim 1, wherein at least one of the soil sealants comprises vinyl acrylic polymer.

6. The soil treatment of claim 1, wherein the soil treatment comprises a high albedo coloring pigment material.

7. The method of claim 1, wherein the soil treatment further comprises at least one of fly ash, cement, lime, gypsum, polymer, an asphalt emulsion, an asphalt cutback, a non-bituminous prime coat product, or a combination thereof.

8. The method of treating soil to increase efficiency of bifacial solar panels of claim 1, wherein stabilizing the soil comprises mechanical stabilization or chemical stabilization.

9. The method of treating soil to increase efficiency of bifacial solar panels of claim 1, further comprising mixing a high albedo coloring pigment material with one or more soil stabilization aids and adding said mixture to the soil.

10. The method of treating soil to increase efficiency of bifacial solar panels of claim 1, wherein the soil sealant comprises a dust control agent, a soil erosion preventative, a soil surface hardener, or a combination thereof.

11. A method of treating a soil surface to increase efficiency of bifacial solar panels, comprising applying a fog coat to a soil surface under an installation of one or more bifacial solar panels, wherein the fog coat comprises a soil treatment to increase the reflectivity of the soil relative to untreated soil.

12. The method of claim 11, wherein the fog coat comprises vinyl acrylic polymer.

13. The method of claim 11, wherein the fog coat comprises titanium dioxide.

14. The method of treating a soil surface to increase efficiency of bifacial solar panels of claim 11, wherein the fog coat reduces permeability of the soil surface, seals a portion of the soil surface, or seals at least partially one or more cracks on the soil surface.

* * * * *